Oct. 8, 1968
B. O. FRIEBERG
3,404,792
MATERIAL HANDLING DEVICE
Filed Oct. 8, 1965
3 Sheets-Sheet 1
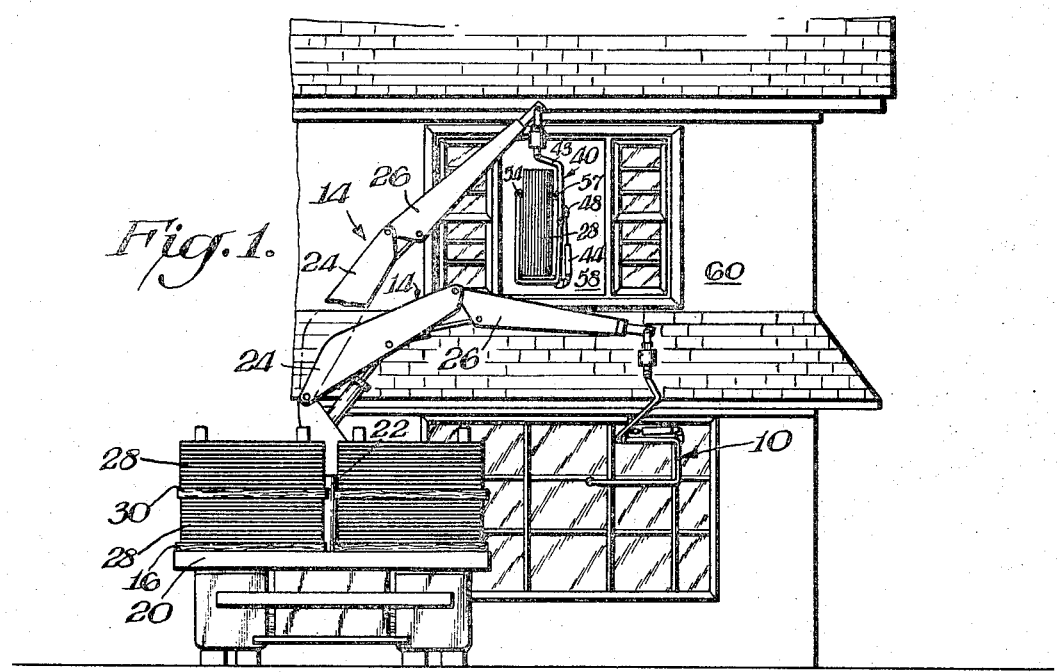
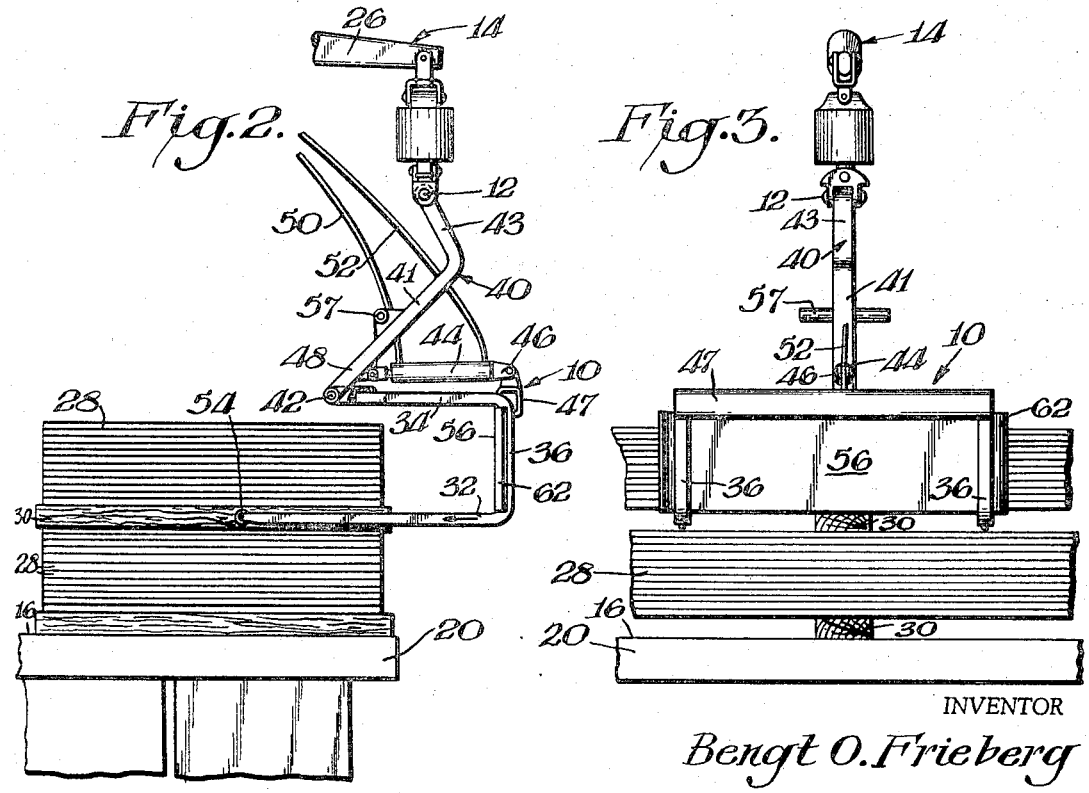
INVENTOR
Bengt O. Frieberg
BY Connolly and Hutz
ATTORNEYS

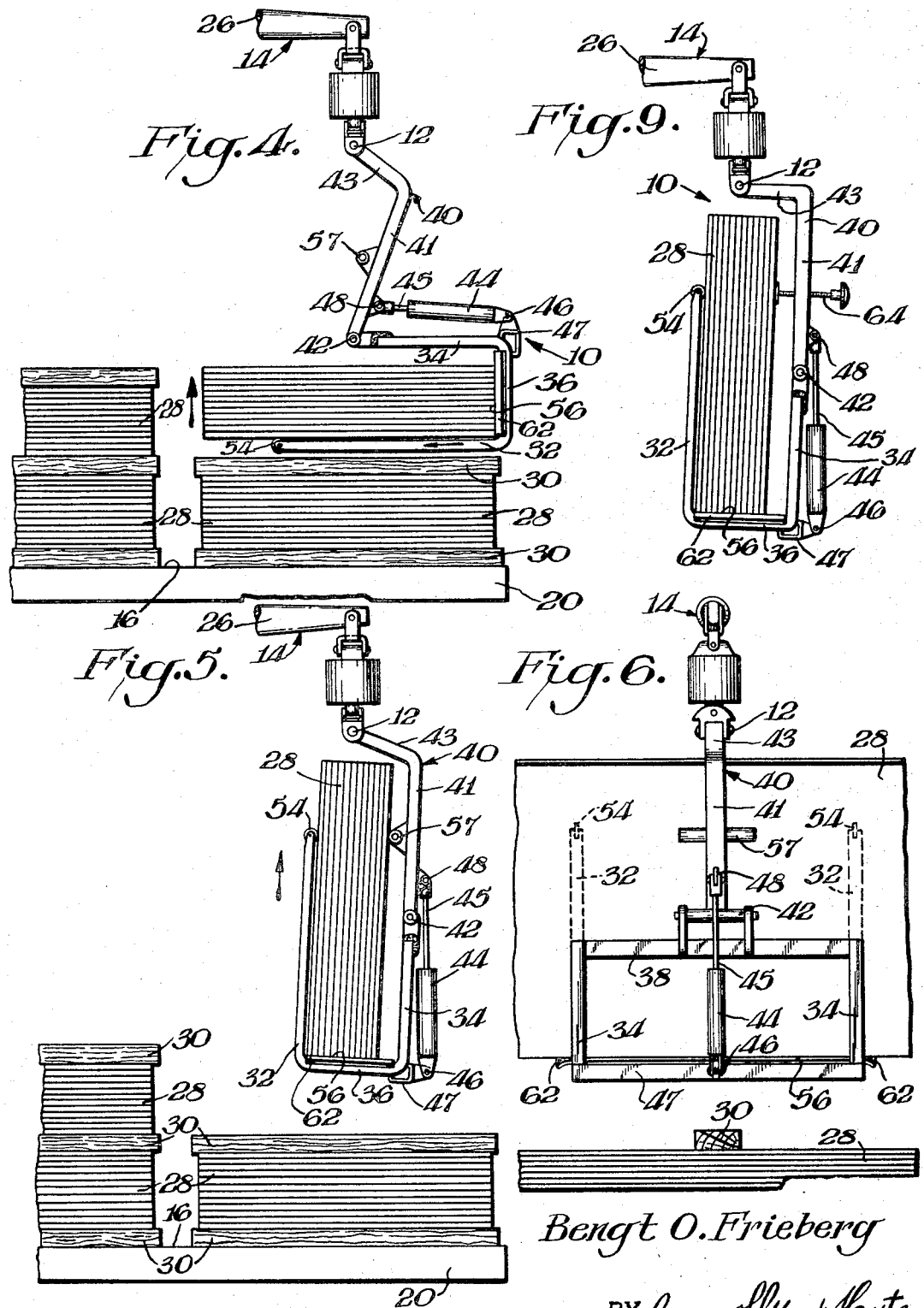

Oct. 8, 1968   B. O. FRIEBERG   3,404,792
MATERIAL HANDLING DEVICE
Filed Oct. 8, 1965   3 Sheets-Sheet 3

INVENTOR
Bengt O. Frieberg
BY Connolly and Hutz
ATTORNEYS

United States Patent Office 3,404,792
Patented Oct. 8, 1968

3,404,792
MATERIAL HANDLING DEVICE
Bengt O. Frieberg, Wilmington, Del., assignor to Hiab Hydraulics Corporation, Wilmington, Del., a corporation of Delaware
Filed Oct. 8, 1965, Ser. No. 494,119
13 Claims. (Cl. 214—80)

ABSTRACT OF THE DISCLOSURE

A material handling device, which transports articles from one location to another, is mounted on the end of the outer member of a boom. During the stored condition of the device, such as during transportation, the outer member of the boom is disposed on, for example, a vehical cab in a substantially horizontal position and the material handling device rests upon the outer member with a locking device on the outer member engaging the material handling device.

This invention relates to a material handling device for sheet material such as wall board, and more particularly to such a device which transports stacks of sheet material from one location to another.

Shet material is generally transported on a truck or other suitable vehicle. When the material is delivered it must be removed from the truck and is usually deposited at a more convenient location for either storage or immediate use. For example, when wall board is delivered the sheets are frequently removed from the truck and placed directly in a house for use therein. The sheets are accordingly raised from the truck and disposed adjacent a window where the sheets are manually removed from the sheet holding device. Because of sheet dimensions they cannot be withdrawn horizontally from the device but must be tilted to fit through the window.

Various attempts have been made, with limited success, to provide an efficient material handling device which minimizes the manual effort and time involved. For example, in one such attempt an L-shaped device is secured at the end of a boom or derrick. The device is manipulated to dispose its longer leg under a stack of sheets. By use of a complicated linkage arrangement the device is tilted as it is raised so that the sheets, in turn, are tilted when disposed near the window whereupon they can be manually removed one at a time. This arrangement has a number of serious drawbacks. For example, the device is bulky and heavy and contains a large number of parts which makes it both expensive to produce and cumbersome to use and store. Additionally, because it is L-shaped with two open sides, the degree which it can be tilted is limited. In this respect if the tilting approaches a vertical disposition the sheets may fall from the device. Moreover, the supporting surface for the sheets is generally broken or interrupted and thus unsmooth. As a result when fragile sheets such as wall board are removed, the sheets are damaged especially at their corners. Additionally, when the devices of this type are stored, the device is generally arranged across the rear of the truck which drastically limits the height and thus the amount of sheets which can be transported.

An object of this invention is to provide a material handling device and method of operation which overcomes the above noted drawbacks.

A further object is to provide such a device which is lightweight without adverse affect to its efficiency.

In accordance with this invention the material handling device is in the form of a U-shaped fork which is pivotably secured to some elevating means such as a boom or derrick. The fork incorporates a tilting arrangement so that it can be advanced toward a stack of sheet material with the legs of the fork in a substantially horizontal position. When the fork is disposed around the stack of material the fork is raised and tilted substantially 90° so that the individual sheets of material are substantially vertical. As a result there is some degree of play or clearance between the individual sheets which minimizes or even eliminates the friction between the sheets to facilitate their removal from the device. The inventive device has a distinct advantage over the aforementioned prior arrangement, since the sheets are vertical or tilted 90°. With prior arrangements, when the sheets are at a non-vertical angle, the sheets are in surface to surface contact with each other therefore creating a substantial amount of friction between the sheets which greatly adds to the effort required for removing each sheet.

In an advantageous form of this invention the fork includes a U-shaped member with a suspension arm pivotably connected to one of the legs of the U, and the suspension arm also being pivotably connected to the elevating means such as a boom or derrick. A piston cylinder assembly may react between the suspension arm and the U-shaped member adjacent the bight of the U, so that the suspension arm and bight may be rotated toward and away from each ohter. With this arrangement the pivotal connection of the suspension arm to the boom or derrick is substantially directly above the center of gravity of the fork, when the fork is horizontal in its unloaded condition and when the piston is retracted in the cylinder. This location of the pivotal connection assures proper balance for the unloaded fork. The fork is conveniently tilted by simply extending the piston which in turn rotates the U-shaped member toward the vertical disposition. When the fork becomes vertical, the pivotal connection of the suspension arm and the boom is substantially directly above the center of gravity of the fork and its load. Additionally, when the fork is loaded but still in a horizontal position at the beginning of its lifting operation, the pivotal connection of the suspension arm to the U-shaped member is substantially directly above the center of gravity of the fork and its load. By this careful selection of the locations of the pivotal connections, with respect to the centers of gravity at various stages of operation, it is possible to make the material handling device relatively light and to employ a small number of parts while actually enhancing its effectiveness of operation.

Novel features and advantages of the present invention will become apparent to one skilled in the art from a reading of the following description in conjunction with the accompanying drawings wherein similar reference characters refer to similar parts and in which:

FIG. 1 is a side view in elevation of one embodiment of this invention in different phases of operation;

FIG. 2 is a side view on an enlarged scale of the embodiment of the invention shown in FIG. 1;

FIG. 3 is an end view in elevation of the embodiment of the invention shown in FIG. 2;

FIGS. 4–5 are side views in elevation of the embodiment of the invention shown in FIGS. 1–3 in different phases of operation;

FIG. 6 is an end view of the embodiment of this invention shown in FIG. 5;

FIG. 9 is a side view in elevation of another embodiment of this invention;

Figure 10:
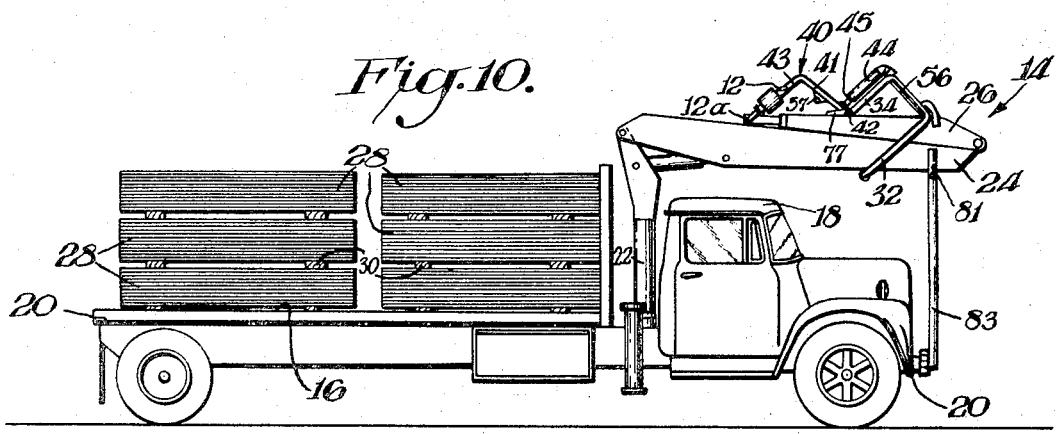
FIG. 10 is a side view in elevation of the embodiments of the invention shown in FIGS. 1–9 in its stored condition.

As shown in FIGS. 1 and 10 material handling device 10 is pivotably secured by joint means such as universal coupling 12 to boom or derrick 14. Boom or derrick 14 is in turn mounted on the platform 16 adjacent cab 18 of truck 20 (see FIG. 10). Since the details of boom or derrick 14 form no part of this invention, it is sufficient to point out that boom 14 is hydraulically operated and includes a vertical member 22 mounted on truck platform 16 with an intermediate number 24 pivotally connected thereto and also connected to end member 26.

Platform 16 of truck 20 supports a plurality of stacks 28 of sheet material such as wall board. The stacks are spaced from each other by any suitable spacer 30, as most clearly shown in FIG. 3 so that the lower legs 32 of material handling device or fork 10 can be inserted between adjacent stacks as shown for example in FIGS. 2 and 4.

Fork 10 is in the form of a generally U-shaped member having a pair of spaced tines 32 (FIGS. 6 and 7) forming one leg of the U, with a pair of parallel stationary arms 34 forming the other leg. Legs 32 and 34 in turn are connected together by bights 36. A cross member 38 interconnects the free ends of stationary arms 34 and a suspension arm 40 is pivotally connected thereto as indicated at 42. Piston cylinder assembly 44 is connected at 46 to cross bar 47 of the U-shaped member and at 48 to suspension arm 40. The piston-cylinder assembly 44 is operated through hydraulic lines 50, 52 which are shown in FIG. 2 but omitted from the remainder of the figures for the sake of clarity.

In operation boom 14 is manipulated to advance fork 10 toward the stacks 28 on truck 20. In this empty or unloaded position the cylinder and piston assembly 44 is retracted, with the joint connection or pivot point 12 of suspension arm 40 and boom 14 being disposed substantially directly above the center of gravity of the fork with fork 10 being in a horizontal orientation. The lower arms or tines 32 of fork 10 may then slide between pairs of stacks 28 of the sheet material on opposite sides of spacer 30. This sliding action is facilitated by bearings 54 at the end of each tine or lower arm 32. Bearings 54 are either ball or roller bearings. Although illustrated as exposed the bearings are actually sealed or covered to prevent accumulation of dirt, etc. therein so as to be maintenance-free. The fork 10 is advanced inwardly until stack 28 contacts glide plate 56 which is secured to bight 36 of the fork.

FIG. 4 indicates the various positions of the fork elements at the beginning of the lifting operation. As shown therein piston 45 of piston-cylinder assembly 44 is slightly retracted so that pivot point 12 is substantially directly above the center of gravity of fork 10 and stack 28. Additionally, in this position pivot point 42 connecting suspension arm 40 to cross bar 38 of the stationary arms 34, is also substantially directly above the center of gravity of the loaded fork. By choosing this particular location for pivot point 42 the lightest possible piston-cylinder assembly 44 may be used. Additionally, it should be pointed out that by locating pivot point 12 above the center of gravity of fork 10 when the fork is empty or unloaded as shown for example in FIG. 2, the best possible balance of the fork assembly in its horizontal position is achieved. Once fork 10 has been loaded, boom 14 is manipulated to raise fork 10 and stack 28. After it has been raised a sufficient amount piston-cylinder assembly 44 is again actuated to extend piston 45 and thereby cause the U-shaped member connected to suspension arm 40 to rotate clockwise so that the stack 28 approaches a vertical disposition.

Suspension arm 40 has a cylindrical contact member 57 mounted thereon for purposes which will hereinafter become apparent. As piston 45 is extended to cause the bight 36 of fork 10 and the suspension arm 40 to rotate away from each other, suspension arm 40 and stack 28 are moved toward each other. Since there is clearance between the top sheet of stack 28 and upper stationary arms 34 there will be play between the sheets when the stack is disposed in a vertical orientation. It is desirable when transporting the stack to, for example, window 58 of house 60 to minimize this play or clearance. This is accomplished by cylindrical contact member 56. As stack 28 and suspension arm 40 are moved toward each other the cylindrical surface of contact member 57 presses against the stack to squeeze the sheets together and hold them steady during their aerial movement. This squeezing continues until the play between the sheets is sufficiently eliminated as shown in FIG. 5. In this position pivot point 12 is disposed substantially directly above the center of gravity of fork 10 and its load 28.

Figure 7:
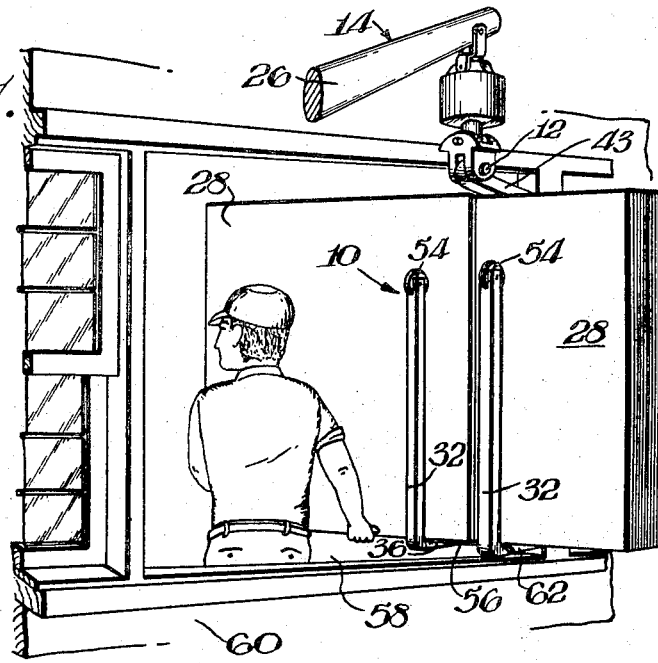
FIG. 7 is a perspective view of the embodiment of the invention shown in FIGS. 1–6 in its final phase of operation.
Figure 8:
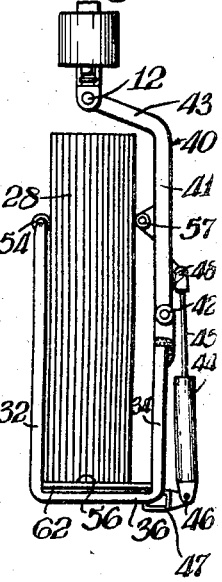
FIG. 8 is a side view in elevation of the embodiment of the invention shown in FIG. 7.

After the load has been moved adjacent window 58 as shown in FIGS. 1, 7 and 8, piston 45 is retracted slightly to again permit play between the sheets of stack 28. Advantageously, bight 36 of fork 10 is provided with a smooth glide plate 56, which has a pair of rounded or bent ends 62. Accordingly, a workman may simply remove the sheets one at a time if desired by simply sliding each sheet over glide plate 56 and into the room. The provision of glide plate 56 is particularly advantageous when transporting fragile sheets such as wall boards which would otherwise be damaged especially at their corners if this smooth gliding surface were not provided. Additionally, the removal of the sheets is facilitated by having the ends 62 slope away from the main supporting surface of glide plate 56. Moreover, the sheets are maintained free from damage during their aerial movement by raising the sheets horizontally until the load is sufficiently above the truck. The sheets are then tilted 90° with the arcuate contact surface pressing against them to eliminate play, and then the sheets are moved to their desired location.

FIG. 9 shows another form of this invention in which the cylindrical contact member 37 is replaced by a threaded adjustable contact member 64. In this modification member 64 is adjusted to contact stack 28 and thereby eliminate the play between the sheets.

Another advantageous feature of fork 10 is that suspension arm 40 is bent and includes a straight portion 41 and an inclined or offset portion 43 which is at an obtuse angle with respect to portion 41. As most clearly shown in FIG. 5 the effective length of stationary arms 34 and straight portion 41 is substantially as long as the width of the sheets in stack 28. Thus it is possible to dispose the arrangement in the manner illustrated in FIG. 5 with the inclined portion 43 extending upwardly and away from the stack of sheets 28 so as not to interfere with disposing the sheets in their vertical position.

FIG. 9 also shows an alternative arrangement wherein the offset portion of suspension arm 40 is substantially at right angles to the straight portion. Additionally, the effective length of stationary arms 34 and the straight portion is longer than the width of the sheets to again dispose pivot point 12 substantially directly above the center of gravity of the loaded vertical fork. The offset portion may also be inclined at an acute angle to effect the same results.

Figure 11:
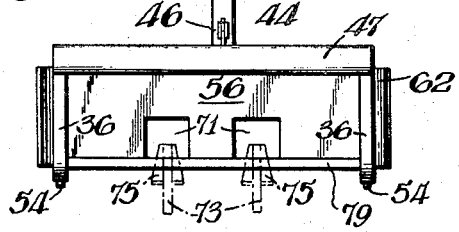
FIG. 11 is a front view in elevation of a portion of the embodiment shown in FIG. 10.

FIGS. 10–11 illustrate fork 10 in its stored condition during for example transportation. As most clearly shown in FIG. 11 glide plate 56 includes a pair of slots 71. The outer boom member or end member 26 has secured thereto a pair of hooks 73. As most clearly shown in FIG. 11 these hooks include tapered leading ends 75 to assure proper registry of the hooks in slots 75 as later described. Outer boom 26 also includes a projection 77 as shown in FIG. 10. When fork 10 is to be stored outer boom 26 and intermediate member 24 are rotated toward each other with the fork being in the extended position shown for example in FIG. 5. As boom members 24 and 26 are rotated toward each other bight 36 comes to rest on outer boom 26 with hooks 73 being disposed in slots 71 of glide plate 56. The tapered lead ends 75 assure the accurate registry of the hooks 73 in slots 71 in the event that they are not initially in proper orientation. Piston 45 is then retracted into cylinder 44 to cause joint 42 to move downwards until it is trapped under projection 77 which may extend completely over joint 42, with bight 36 being forced against hooks 73 to assure a firm securement of the hooks in the glide plate. Since the hooks act downwardly against glide plate 56 a reinforcing strip 79 is provided across the bottom of the glide plate to prevent damage thereto. As indicated in FIG. 10 fork 10 is firmly anchored to outer boom 26 by being secured at two spaced locations i.e. glide plate slots 71 and joint 42. This is particularly important when considering that the fork is secured to the outer boom by a pair of pivotal connections 12 and 12a (FIG. 10). Thus if the fork were secured or latched at only one connection the fork might work itself loose due to its very flexible connection to the outer boom. As indicated in FIG. 10 the inner boom 24 may then be disposed in yoke 81 on support rod 83.

Obviously, many modifications and variations of the present invention are possible in the light of the above teachings. It is therefore to be understood that within the scope of the appended claims the invention may be practiced otherwise than as specifically described.

What is claimed is:

1. A material handling device for transporting articles from one location to another comprising, in combination, elevating means including a boom, said boom having a substantially vertical member, an outer member, an intermediate member pivotally connected to said substantially vertical member and to said outer member, material holding means, joint means connecting said material holding means to said outer member of said boom whereby actuation of said boom causes the articles held in said material holding means to be elevated and transported, said material holding means including a receiving member and at least two tines for supporting the articles, said material holding means being connected to said outer member in such a manner that said material holding means rests upon said outer member when said outer member is substantially horizontal during non-use, and locking means on said outer member for engaging said receiving member of said material holding means to maintain said material holding means relatively stationary during non-use and storage.

2. A device as set forth in claim 1 including hydraulically actuatable release means for controlling the locking and unlocking of said material holding means with said locking means.

3. A device as set forth in claim 2 wherein said hydraulically actuatable release means also control the engagement of said material holding means with the articles to be transported.

4. A device as set forth in claim 1 wherein said material holding means includes hydraulic cylinder actuating means, said locking means including a hook disposed between the ends of said outer member, said receiving member being between a pair of said tines, and said hook being over said receiving member in the non-use position.

5. A device as set forth in claim 1 in combination with a vehicle having a cab and a platform in back of said cab, said substantially vertical member of said boom being mounted on said platform, and said outer member of said boom being disposed over said cab during the non-use and storage position of said device.

6. A device as set forth in claim 1 wherein said material holding means includes a U-shaped fork, said tines being legs of said fork, a generally L-shaped arm being pivotally connected at one end to an end of said fork, a hydraulically actuable piston being operatively connected between said arm and said fork, and said joint means being swivel means connecting said arm to said outer member of said boom.

7. A material handling device for transporting sheet material for use with elevating means which raises and lowers the device, comprising a fork for receiving and transporting the sheet material, said fork being in the form of a U-shaped member having a pair of legs and a connecting bight, a suspension arm pivotally connected to one of said legs, joint means for connecting said suspension arm to the elevating means, an expansible assembly reacting between suspension arm and said one of said legs for causing said fork to rotate with respect to said suspension arm whereby said fork may be rotated from a substantially horizontal material receiving position to a substantially vertical material transporting position, contact means being on said suspension arm for contacting the material when said fork is in said substantially vertical position to minimize play between the sheets of the material being transported, and said contact means being a tubular member having an arcuate contact surface which contacts the material when said fork is rotated to said substantially vertical position.

8. A material handling device for transporting sheet material for use with elevating means which raises and lowers the device, comprising a fork for receiving and transporting the sheet material, said fork being in the form of a U-shaped member having a pair of legs and a connecting bight, a suspension arm pivotally connected to one of said legs, joint means for connecting said suspension arm to the elevating means, an expansible assembly reacting between said suspension arm and said one of said legs for causing said fork to rotate with respect to said suspension arm whereby said fork may be rotated from a substantially horizontal material receiving position to a substantially vertical material transporting position, each of said legs comprising a pair of spaced tines, said bight comprising a pair of spaced connecting members joining a tine from each of said legs, a continuous glide plate completely bridging the gap between said connecting members to provide a continuous surface over which the sheet material may be slid during removal from said fork when said fork is in said substantially vertical position with said glide plate being substantially horizontal.

9. A device as set forth in claim 8 wherein the ends of said glide plate slope away from the supporting surface of said glide plate to facilitate the removal of the sheets therefrom.

10. A device as set forth in claim 8 wherein slot means are in said glide plate.

11. A material handling device for transporting sheet material, for use with elevating means which raises and lowers the device comprising a fork for receiving and transporting the sheet material, said fork being in the form of a U-shaped member for fitting around a stack of the sheet material with the weight of the stack acting downwardly toward one of the legs of said fork when the stack and said fork are substantially horizontal, said fork incorporating tilting means for rotating said fork and its stack substantially 90° when said fork is raised whereby the stack is supported on the bight of said U-shaped member in a substantially vertical orientation to minimize friction between adjacent sheets of material and facilitate their removal from said fork, said tilting means including a suspension arm, joint means on said suspension arm for connection to the elevating means, pivot means for rotating the suspension arm and said bight of said U-toward and away from each other with said joint means being disposed substantially directly above the center of gravity of said fork when said fork is substantially horizontal in its unloaded condition and said joint means being substantially directly above the center of gravity of said fork and its stack when said fork is substantially vertical in its loaded condition, a glide plate being secured to said bight for providing a smooth support surface for the sheets when said fork is substantially vertical, said glide plate having slot means therein, in combination with a boom, said elevating means including said boom, said boom having an outer member, said joint means connecting said outer member to said suspension arm, hook means on said outer member for entering said glide plate slot means, and catch means on said outer member for engaging said pivot means.

12. A device as set forth in claim 11 wherein a reinforcing strip is across the bottom of said glide plate bordering said slot means whereby said hook means act against said reinforcing strip when said hook means are in said slot means, said hook means having tapered lead ends for assuring their registry in said slot means, and said catch means being a flange extending toward said hook means.

13. A device as set forth in claim 11 in combination with a vehicle, said boom including a substantially vertical member mounted on said vehicle, an intermediate member pivotally connected to said substantially vertical member and to said outer member, said intermediate member extending over the front end of said vehicle in a substantially horizontal position, said outer member being folded over said intermediate member in a substantially horizontal position, said U-shaped member of said fork straddling said outer and intermediate boom members, said hook means being engaged in said glide plate slot means, and said catch means engaging said suspension arm pivot means.

References Cited

UNITED STATES PATENTS

| | | |
|---|---|---|
| 3,075,664 | 1/1963 | Collings. |
| 3,253,852 | 5/1966 | Wheat _____ 214—1 |
| 3,275,367 | 9/1966 | Bopp _____ 294—67 |
| 3,301,587 | 1/1967 | Heikkinen _____ 294—67 |

ROBERT G. SHERIDAN, *Primary Examiner.*